(12) United States Patent
Chan

(10) Patent No.: US 7,993,121 B1
(45) Date of Patent: Aug. 9, 2011

(54) WINDSHIELD REPAIR APPARATUS

(76) Inventor: Yi-Chang Chan, San Chung (TW)

( * ) Notice: Subject to any disclaimer, the term of this patent is extended or adjusted under 35 U.S.C. 154(b) by 55 days.

(21) Appl. No.: 12/621,511

(22) Filed: Nov. 19, 2009

(51) Int. Cl.
*B29C 73/02* (2006.01)
(52) U.S. Cl. ............ 425/13; 264/36.21; 425/11; 425/12
(58) Field of Classification Search .................... 425/11, 425/12, 13; 264/36.1, 36.21
See application file for complete search history.

(56) References Cited

U.S. PATENT DOCUMENTS

| | | | | |
|---|---|---|---|---|
| 4,775,305 A | * | 10/1988 | Alexander et al. | 425/12 |
| 4,776,780 A | * | 10/1988 | Banks | 425/12 |
| 4,814,185 A | * | 3/1989 | Jones | 425/12 |
| 4,826,413 A | * | 5/1989 | Matles | 425/12 |
| 4,919,602 A | * | 4/1990 | Janszen | 425/12 |
| 5,069,836 A | * | 12/1991 | Werner et al. | 264/36.21 |
| 5,589,018 A | * | 12/1996 | Campfield | 156/94 |
| 5,607,180 A | * | 3/1997 | Kornhauser | 280/736 |
| 5,643,609 A | * | 7/1997 | Jan | 425/12 |
| 5,837,294 A | * | 11/1998 | Shrimpton | 425/12 |
| 5,948,331 A | * | 9/1999 | Beckert et al. | 264/36.21 |
| 5,954,901 A | * | 9/1999 | Henderson | 156/94 |
| 6,033,507 A | * | 3/2000 | Campfield | 156/94 |
| 6,042,353 A | * | 3/2000 | Thomas et al. | 425/12 |
| 6,302,670 B1 | * | 10/2001 | Thomas et al. | 425/12 |
| 6,338,619 B1 | * | 1/2002 | Rusch | 425/11 |
| 6,422,849 B1 | * | 7/2002 | Grubb | 425/12 |
| 2002/0058080 A1 | * | 5/2002 | Curl | 425/12 |
| 2002/0100991 A1 | * | 8/2002 | Evans | 264/36.21 |
| 2003/0205831 A1 | * | 11/2003 | Rawlins et al. | 264/36.21 |

\* cited by examiner

*Primary Examiner* — Yogendra Gupta
*Assistant Examiner* — Emmanuel S Luk
(74) *Attorney, Agent, or Firm* — Pro-Techtor Int'l Services; Ralph Willgohs

(57) ABSTRACT

A windshield repair apparatus includes a base, a pressurizing barrel, a pressurizing bar and a rotary tube. The base includes a bracket and at least one sucking disc. The sucking disc is provided with a perforation for transfixing the pressurizing barrel. An interior of the pressurizing barrel can be inserted with the pressurizing bar and when a rotary tube is screwed on the pressurizing barrel, the pressurizing bar can be squeezed down at a same time, allowing a repairing liquid in the pressurizing barrel to flow more deeply into a crevice of windshield by strong air pressure.

4 Claims, 5 Drawing Sheets

WINDSHIELD REPAIR APPARATUS

BACKGROUND OF THE INVENTION a) Field of the Invention

The present invention relates to a repair apparatus, and more particularly to a windshield repair apparatus, which is rotated to squeeze down the pressurizing bar, allowing a repairing liquid in the pressurizing barrel to flow into a crevice of windshield along the exit hole of the plug.

b) Description of the Prior Art

When a windshield of a car is collided by a small rock or other alien particles, a fissure is often produced on the windshield. If the windshield is not repaired in time, the fissure will further expand to make the windshield become cracky. According to the conventional windshield repair measure, a repair liquid is directly filled into the fissure to naturally flow along the fissure without being forced by any assistant air pressure. Therefore, the repair liquid often fails to flow into some tail ends of the fissure and thus the windshield can be hardly firmly and durably repaired. In addition, the repaired fissure often leaves an unsmooth surface on the windshield and results in a poor appearance.

Therefore, it is necessary to provide an improved windshield repair apparatus which is able to more firmly, durably and smoothly repair the windshield.

SUMMARY OF THE INVENTION

It is therefore a primary object of the present invention to provide an improved windshield repair apparatus which utilizes air pressure to evenly force the repair liquid into every corners of a fissure of the windshield so as to more firmly, durably and smoothly repair the windshield.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
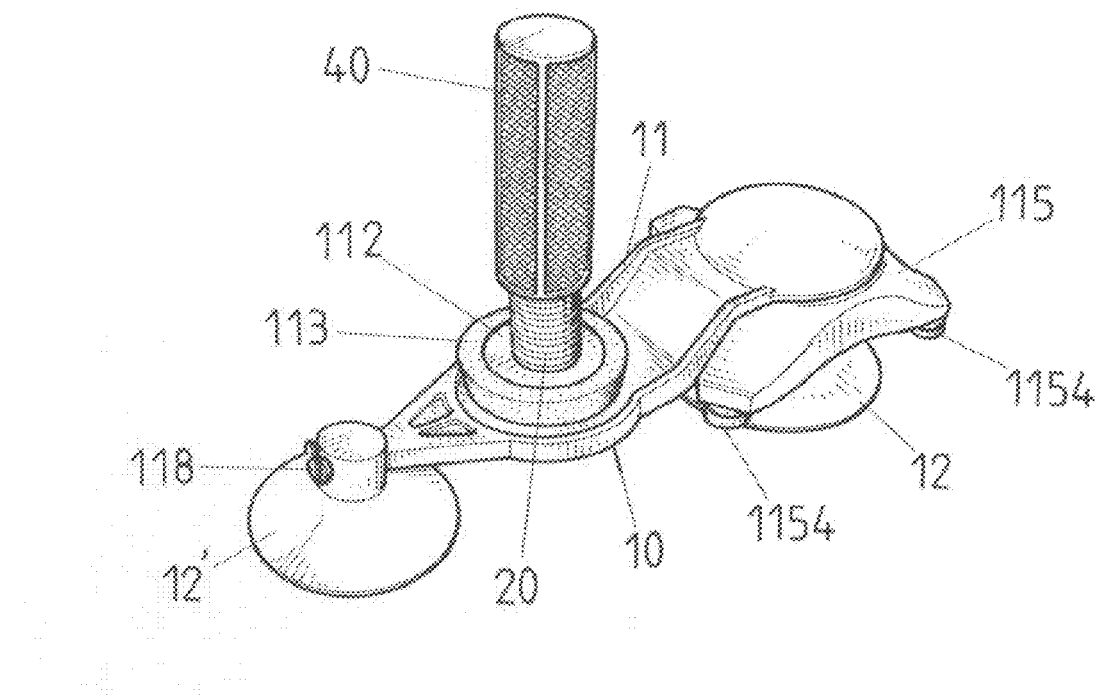
FIG. 1 is a perspective assembled view of the present invention.
Figure 2:
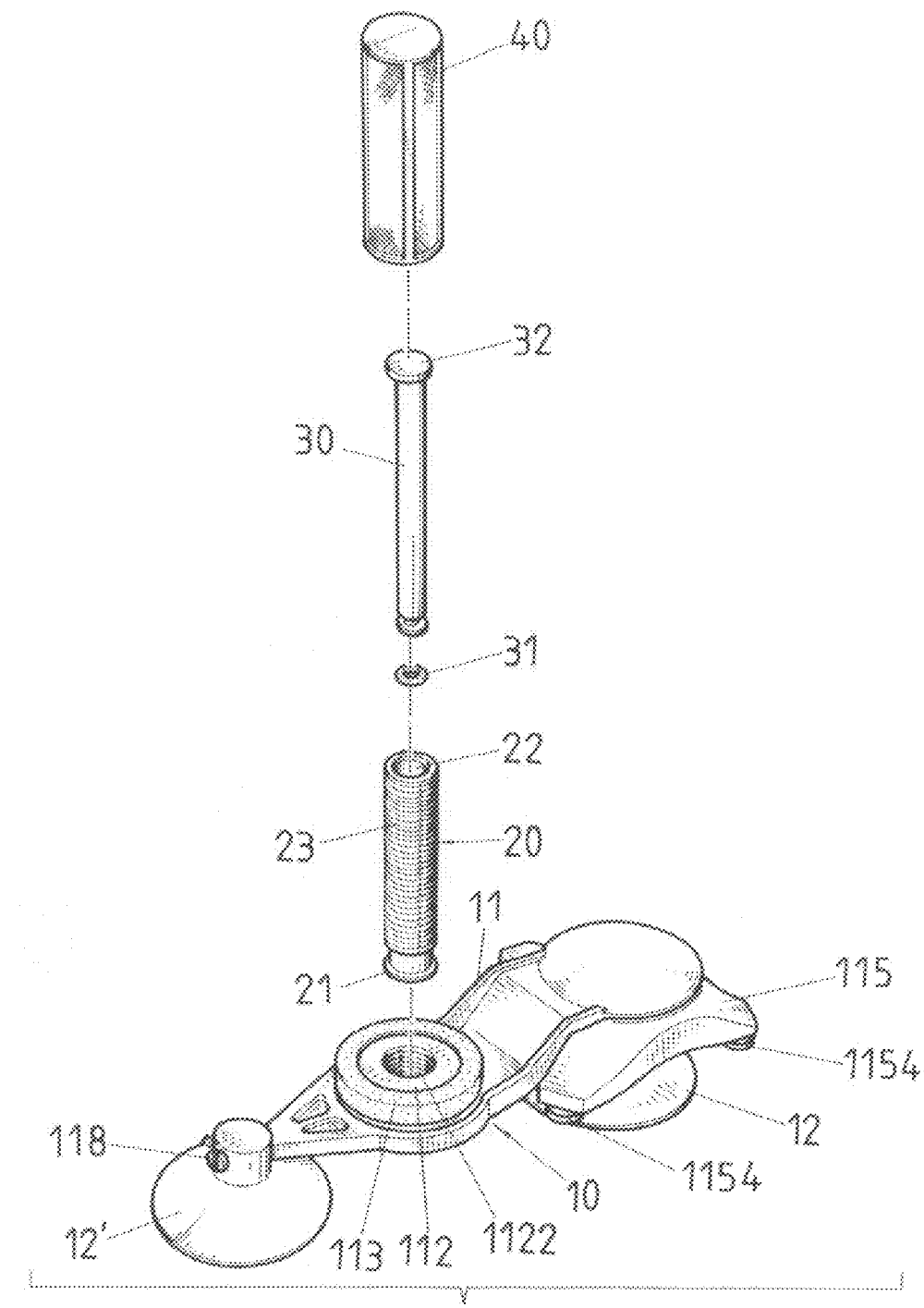
FIG. 2 is perspective partially exploded view of the present invention.
Figure 3:
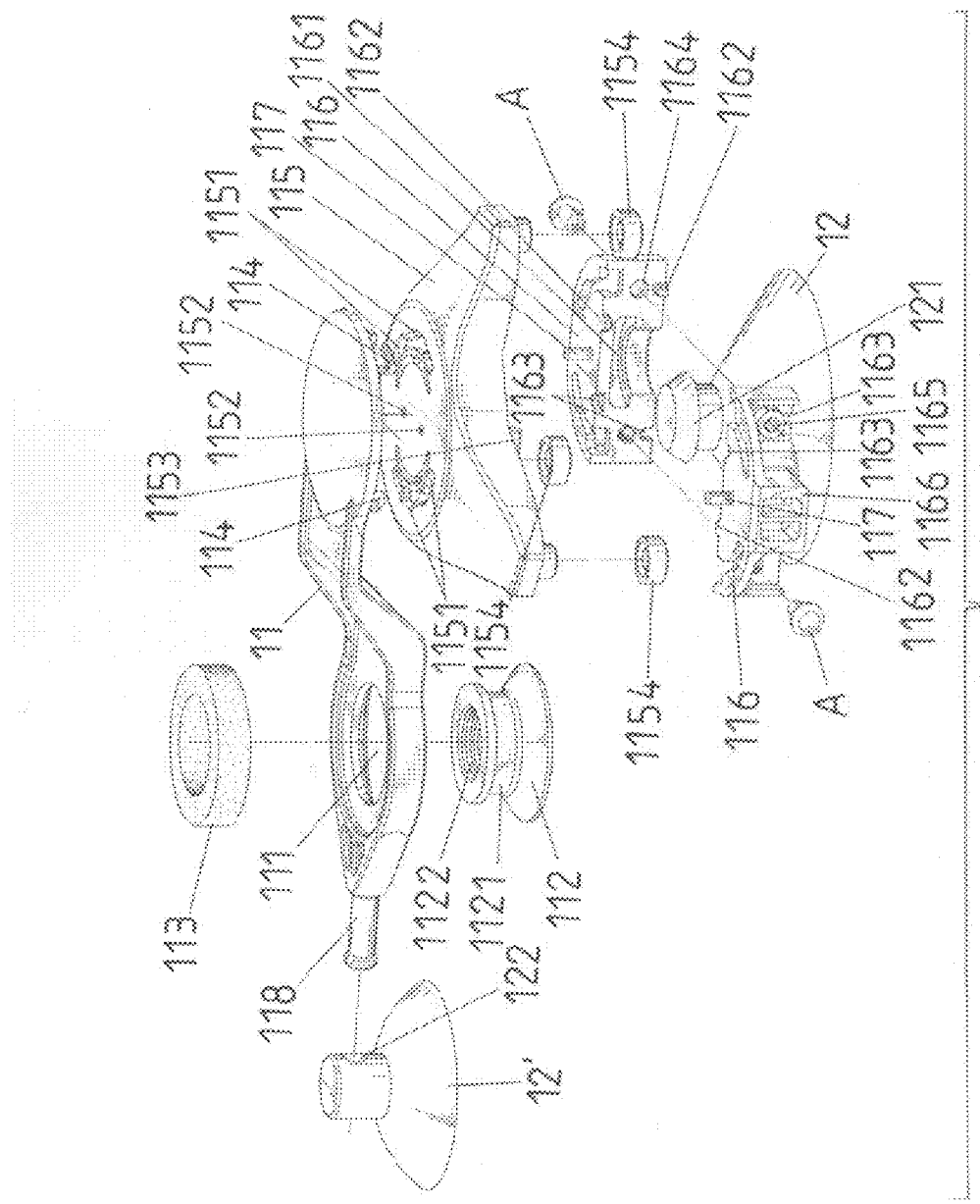
FIG. 3 is a perspective exploded view of the base of the present invention.
Figure 5:
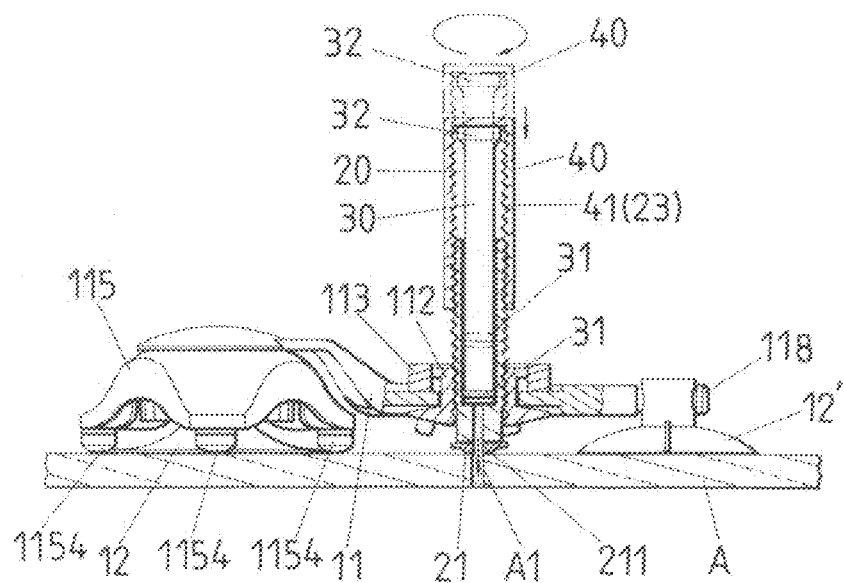
FIG. 5 is a side sectional view of the present invention.

Please refer to FIGS. 1 to 3, the present invention mainly includes a base 10, a pressurizing barrel 20, a pressurizing bar 30 and a rotary tube 40. The base 10 includes a bracket 11 and at least a sucking disc 12, 12'. The sucking discs 12, 12' are connected at an end of the bracket 11 on which is provided with a perforation 111 for transfixing the pressurizing barrel 20. A bottom end of the pressurizing barrel 20 is inserted with a soft plug 21, an interior of which is provided with an exit hole 211 (as shown in FIG. 5). A dent hole 22 above the pressurizing barrel 20 is inserted with the pressurizing bar 30, an O-ring 31 is sheathed at a location close to a bottom end of the pressurizing bar 30, and a top end of the pressurizing bar 30 is provided with a pressurizing block 32; whereas, the rotary tube 40 is sheathed on the pressurizing barrel 20. Please referring to FIG. 5, an inner thread 41 of the rotary tube 40 can be screwed on an outer thread 23 of the pressurizing barrel 20, and when the plug 21 is aligned with a crevice A1 of a windshield A, the sucking discs 12, 12' will be adsorbed on the windshield A for positioning. At this time, a repairing liquid is poured into the pressurizing barrel 20 and flows into the crevice A1 of windshield A along the exit hole 211 of the plug 21. On the other hand, the pressurizing bar 30 is inserted into the pressurizing barrel 20, the rotary tube 40 is screwed on the pressurizing barrel 20, and the pressurizing bar 30 is squeezed down to push air, such that by air pressure, the repairing liquid can flow uniformly into the crevice A1.

Figure 4:
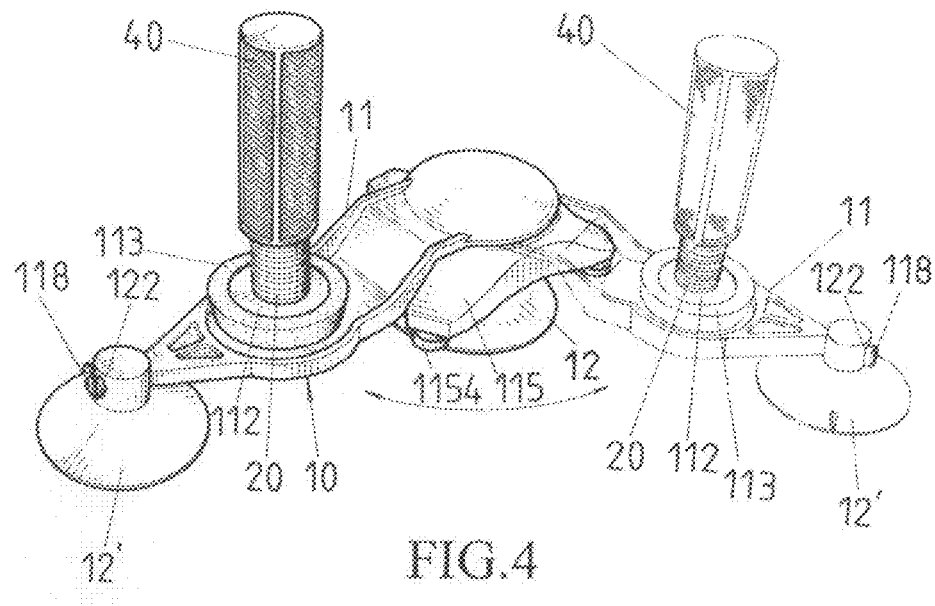
FIG. 4 is perspective partially exploded view showing the application of the present invention.

Please refer to FIGS. 1 to 3, it shows an embodiment of the base 10 of the present invention, wherein after a block 112 at a bottom end of the bracket 11 of the base 11 has been transfixed into the perforation 111, a collar 113 is latched above a neck part 1121 of the block 112 for positioning, and a screw-hole 1122 at a center of the block 112 can provide for screwing with the outer thread 23 of the pressurizing barrel 20. A bottom at the other end of the bracket 11 is provided with at least one hook 114 which is hooked in a hole 1151 of a bottom seat 115 for positioning. A center of the bottom seat 115 is provided with two positioning holes 1152, an inner rim at the bottom is provided with two hook rods 1153, an outer rim at the bottom is provided with at least one pad 1154, a bump 121 at a top end of a sucking disc 12 provides for clamping of a groove 1161 of two holders 116, the two semicircular and symmetrical holders 116 are latched with each other by a pin 1162 and a pin hole 1163, and then two screws B are used to penetrate a through-hole 1164 of one holder 116 to be locked into a screw-hole 1165 of the other holder 116. Top ends of the two holders 116 are provided respectively with a positioning pin 117 to be latched into the positioning hole 1152 of the bottom seat 115, and two hook rods 1153 of the bottom seat 115 are hooked respectively at a bottom end of a holder block 1166 of the holder 116, to form the base 10 as shown in FIG. 2. Referring to FIG. 4, after the sucking disc 12 below the bottom seat 115 has been adsorbed on the windshield, the bracket 11 can rotate freely to be positioned with a top end of the sucking disk 12 as a center, and then the sucking disc 12' at the other end of the bracket 11 is adsorbed on the windshield, with a dent hole 122 at a top end of the sucking disc 12' providing for insertion with an insertion rod 118 at one end of the bracket 11.

Figure 6:
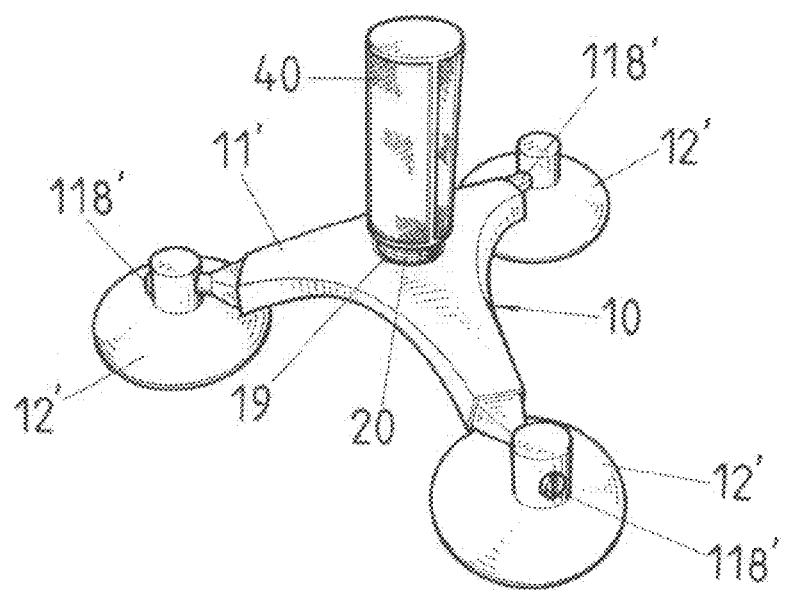
FIG. 6 shows another embodiment of the present invention.

Please refer to FIG. 6, it shows another embodiment of the base 10 of the present invention, wherein a bracket 11' of the base is in a triangular shape, three tips of the bracket 11' are provided respectively with an insertion rod 18' to connect a sucking disc 12', and a center of the bracket 11' is provided with a screw-hole 19 to screw and position the pressurizing barrel 20.

Figure 7:
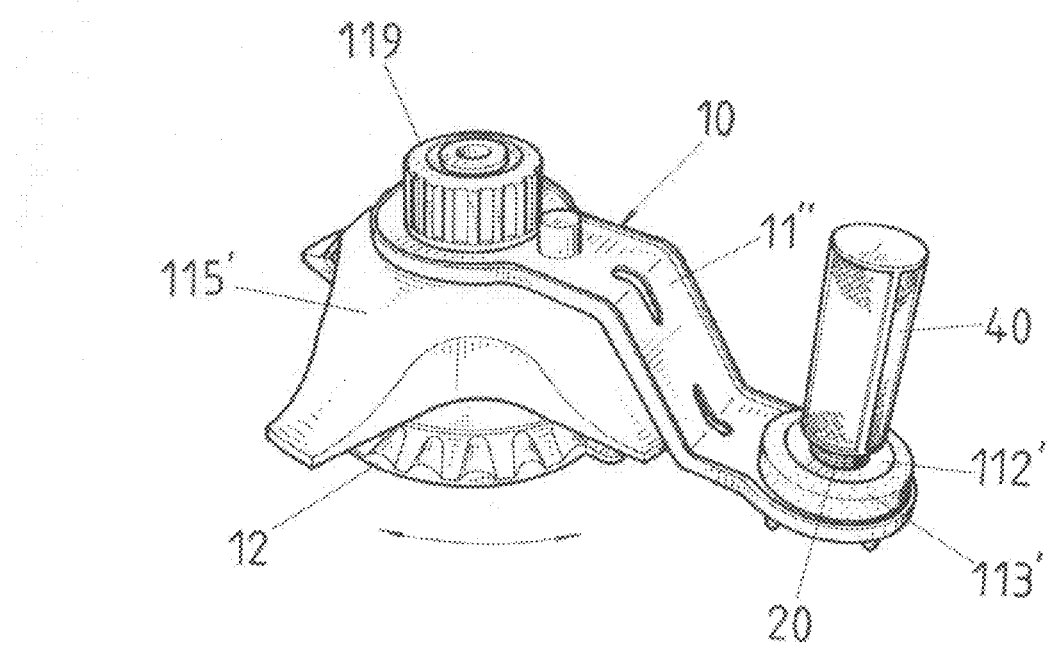
FIG. 7 shows still another embodiment of the present invention.

Please refer to FIG. 7, it shows still another embodiment of the base 10 of the present invention, where a lower side of a bottom seat 115' of a bracket 11" of the base 10 is connected with the sucking disc 12, and the bracket 11" is locked on the bottom seat 115' using a knob 119. When the knob 119 is rotated loose, the bracket 11" can be rotated to adjust an angle, and a perforation (not shown in the drawings) at the other end of the bracket 11" is also transfixed with a block 112' and a collar 113' to screw and position the pressurizing barrel 20.

It is to be understood that the above description and drawings are only used for illustrating some embodiments of the present invention, not intended to limit the scope thereof. Any variation and derivation from the above description and drawings should be included in the scope of the present invention.

What is claimed is:

1. A windshield repair apparatus comprising:
a base which includes a bracket and at least one sucking disc, with the bracket being provided with a perforation and the sucking disc being connected at an end of the bracket;
a pressurizing barrel, which is transfixed into the perforation of the base, an interior of which is provided with a dent hole, and a bottom end of which is inserted with a plug, with the plug containing an exit hole;
a pressurizing bar, which is put into the dent hole of the pressurizing barrel, a location close to a bottom end of which is sheathed with an O-ring and a top end of which is provided with a pressurizing block; and
a rotary tube, which is sheathed on the pressurizing barrel, an inner thread of which is screwed on an outer thread of the pressurizing barrel, and which is rotated to squeeze down the pressurizing bar, allowing a repairing liquid in the pressurizing barrel to flow into a crevice of windshield along the exit hole of the plug;
wherein a block at a bottom end of the bracket of the base is transfixed into the perforation of the bracket, a top of a neck part of the block is latched with a collar, a central screw-hole provides for screwing with an outer thread of the pressurizing barrel, a bottom at the other end of the bracket is provided with at least one hook which is hooked into a hook hole at a bottom seat for positioning, a center of the bottom seat is provided with two positioning holes, an inner rim at the bottom is provided with two hook rods, an outer rim is provided with at least one pad, a bump at a top end of one sucking disc provides for clamping a groove of two holders, the two semi-circular and symmetrical holders are latched with each other by a pin and a pinhole, top ends of the two holders are provided respectively with a positioning pin to be latched into the positioning hole of the bottom seat, and the two hook rods of the bottom seat are hooked respectively at a bottom end of a holder block of the holder.

2. The apparatus of claim 1, wherein an end of the bracket is provided with an insertion rod, and the sucking disc is provided with a dent hole which provides for insertion with the insertion rod.

3. The apparatus of claim 1, wherein the bracket is in a triangular shape, three tips of the bracket are provided respectively with an insertion rod, and a center of the bracket is provided with a screw hole to screw and position the pressurizing barrel.

4. The apparatus of claim 1, wherein a lower side of a bottom seat at one end of the bracket of the base is connected with a sucking disc, the bracket is locked on the bottom seat using a knob and if the knob is rotated loose, the bracket is rotated to adjust an angle; a perforation at the other end of the bracket is transfixed with a block and a collar to screw and position the pressurizing barrel.

\* \* \* \* \*